United States Patent
Bradbury

[19]

[11] Patent Number: 6,050,645
[45] Date of Patent: Apr. 18, 2000

[54] CLUTCHING MECHANISM FOR AN INFINITELY ADJUSTABLE ARMREST

[75] Inventor: James G. Bradbury, Howell, Mich.

[73] Assignee: Tachi-S Engineering U.S.A., Inc., Farmington Hills, Mich.

[21] Appl. No.: 09/034,437

[22] Filed: Mar. 4, 1998

[51] Int. Cl.$^7$ ........................................................ B60N 2/46
[52] U.S. Cl. .................................. 297/411.38; 297/411.32
[58] Field of Search ............................... 297/411.2, 463.1, 297/411.3, 411.32, 411.35, 411.38, 411.39; 74/527, 434, 813 R, 813 L; 192/200, 203

[56] References Cited

U.S. PATENT DOCUMENTS

| | | | |
|---|---|---|---|
| 3,807,799 | 4/1974 | Freedman | 297/411.32 |
| 4,230,414 | 10/1980 | Cheshire . | |
| 4,496,190 | 1/1985 | Barley . | |
| 4,621,864 | 11/1986 | Hill . | |
| 4,655,501 | 4/1987 | Ishigami et al. . | |
| 4,674,790 | 6/1987 | Johnson . | |
| 4,807,935 | 2/1989 | King . | |
| 4,828,323 | 5/1989 | Brodersen et al. . | |
| 4,946,226 | 8/1990 | Hurn et al. . | |
| 4,978,171 | 12/1990 | Tateyama . | |
| 4,984,847 | 1/1991 | Bedu et al. . | |
| 5,042,877 | 8/1991 | Yokota . | |
| 5,076,645 | 12/1991 | Yokota . | |
| 5,106,160 | 4/1992 | Nomura et al. . | |
| 5,246,267 | 9/1993 | Nagashima et al. . | |
| 5,342,115 | 8/1994 | De Filippo . | |
| 5,409,297 | 4/1995 | De Filippo . | |
| 5,433,509 | 7/1995 | Hotary et al. . | |
| 5,489,143 | 2/1996 | Adachi et al. . | |
| 5,597,209 | 1/1997 | Bart et al. . | |
| 5,702,157 | 12/1997 | Hurite . | |

FOREIGN PATENT DOCUMENTS

| | | |
|---|---|---|
| 003344707 | 6/1985 | Germany . |
| 406141949A | 5/1994 | Japan . |

*Primary Examiner*—Milton Nelson, Jr.
*Attorney, Agent, or Firm*—Dykema Gossett PLLC

[57] ABSTRACT

A clutching mechanism for pivotably mounting a first member relative to a second member includes an axis of rotation, a first member, a second member, a shaft, a coil spring clutching member, a cam plate, and a clutch engagement member. The axis of rotation passes through the first member. The second member is pivotably mounted relative to the first member for relative rotation therebetween about the axis of rotation. The shaft is fixed to the first member and is centered on the axis of rotation. The coil spring clutching member has a helically wound body wrapped around the shaft. A first end of the spring clutching member extends radially outwardly from the body to engage the second member. A second end of the spring clutching member extends radially outwardly from the body as well. The cam plate is fixed relative to the shaft and is disposed adjacent the second member. The clutch engagement member is slideably disposed relative to the second member and receives the second end of the spring clutching member. The clutch engagement member is biased relative to the second member in a first rotative direction to a clutch engaged position by the coil spring clutching member. The clutch engagement member is selectively displaceable in a second rotative direction to a clutch released position responsive to engagement of the clutch engagement member with the cam plate. When the clutch engagement member is in the clutch engaged position, the coil spring clutching member acts as a one-way clutch preventing relative rotation in a first direction in any one of an infinite number of in-use positions while enabling rotation of the second member relative to the first in a second direction. When the clutch engagement member is in the clutch released position, the coil spring clutching member enables rotation in both directions.

10 Claims, 3 Drawing Sheets

6,050,645

CLUTCHING MECHANISM FOR AN INFINITELY ADJUSTABLE ARMREST

FIELD OF INVENTION

The present invention relates to clutching mechanisms, and more particularly to clutching mechanisms for disposition between an armrest and a seat back providing an infinite number of support positions.

BACKGROUND OF THE INVENTION

Typically, an armrest is substantially vertical and flush with the seat back in a non-use position, and is substantially perpendicular to the seat back in an in-use position. Many seat backs can be positioned to various reclining positions in addition to a substantially upright position. Because the armrests are used with the seat backs in both upright and reclined positions, and by people of all shapes and sizes, it is desirable to vary the in-use position of the armrest relative to the seat back to provide the occupant with the desired arm support.

While there are armrests that enable such adjustments, those mechanisms are typically ratchet type mechanisms which offer only a limited number of in-use positions. There is a need for an armrest mechanism which can provide an infinite number of in-use positions.

SUMMARY OF THE INVENTION

A clutching mechanism for pivotably mounting a first member relative to a second member includes an axis of rotation, a first member, a second member, a shaft, a coil spring clutching member, a cam plate, and a clutch engagement member. The axis of rotation passes through the first member. The second member is pivotably mounted relative to the first member for relative rotation therebetween about the axis of rotation. The shaft is fixed to the first member and is centered on the axis of rotation. The coil spring clutching member has a helically wound body wrapped around the shaft. A first end of the spring clutching member extends radially outwardly from the body to engage the second member. A second end of the spring clutching member extends radially outwardly from the body as well. The cam plate is fixed relative to the shaft and is disposed adjacent the second member. The clutch engagement member is slideably disposed relative to the second member and receives the second end of the spring clutching member. The clutch engagement member is biased relative to the second member in a first rotative direction to a clutch engaged position by the coil spring clutching member. The clutch engagement member is selectively displaceable in a second rotative direction to a clutch released position responsive to engagement of the clutch engagement member with the cam plate. When the clutch engagement member is in the clutch engaged position, the coil spring clutching member acts as a one-way clutch preventing relative rotation in a first direction in any one of an infinite number of in-use positions while enabling rotation of the second member relative to the first in a second direction. When the clutch engagement member is in the clutch released position, the coil spring clutching member enables rotation in both directions.

An armrest mechanism pivotably suited for mounting to a seat back includes an armrest, a shaft, a coil spring clutching member, a cam plate, and a clutch engagement member. The armrest has an axis of rotation. The shaft is configured for mounting to a stationary member and is centered on the axis of rotation. The coil spring clutching member has a helically wound body wrapped around the shaft. The first end of the spring clutching member extends radially outwardly from the body to engage the armrest. A second end of the spring clutching member extends radially outwardly from the body as well. The cam plate is fixed relative to the shaft and is disposed adjacent the armrest. The clutch engagement member is slideably disposed relative to the armrest and receives the second end of the spring clutching member. The clutch engagement member is biased relative to the armrest in a first rotative direction to a clutch engaged position by the spring clutching member, and is selectively displaceable in a second rotative direction to a clutch released position responsive to engagement of the clutch engagement member with the cam plate. When the clutch engagement member is in the clutch engaged position, the coil spring clutching member is a one-way clutch, preventing relative rotation in a first direction in any one of an infinite number of in-use positions, while enabling rotation in a second direction. When the clutch engagement member is in the clutch released position, the coil spring clutching member enables rotation in both directions.

The armrest employing the clutching mechanism of the present invention is advantageously adjustable to any one of an infinite number of in-use positions.

DETAILED DESCRIPTION OF A PREFERRED EMBODIMENT

Figure 1:
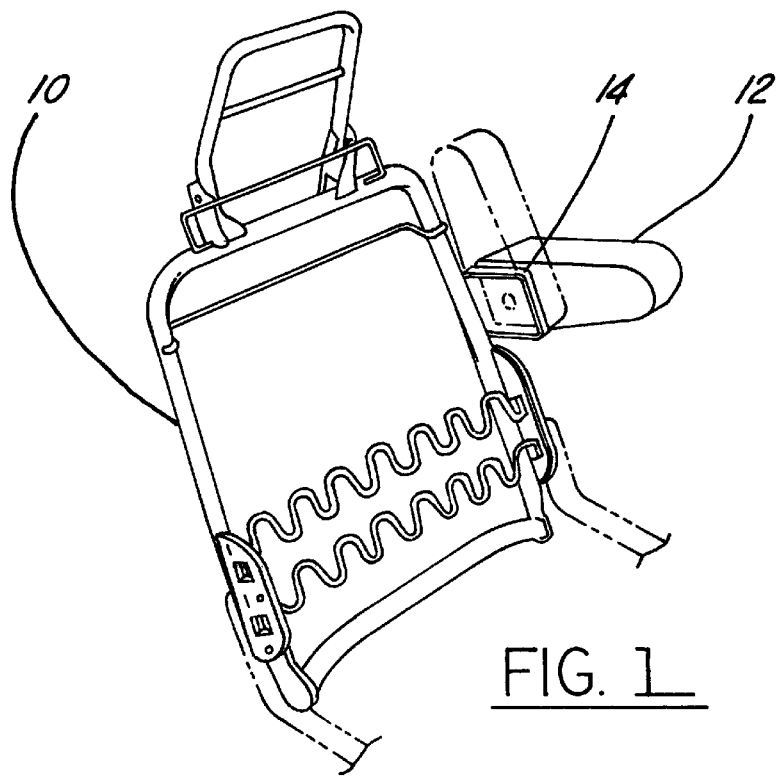
FIG. 1 is a perspective view of a seat back frame with an armrest pivotably attached thereto.

FIG. 1 shows a seat back 10 with an armrest 12 pivotably attached thereto for movement between a first or in-use position substantially normal to seat back 10 and a second or non-use position substantially parallel to seat back 10. A clutching mechanism 14 is disposed between seat back 10 and armrest 12.

Figure 2:
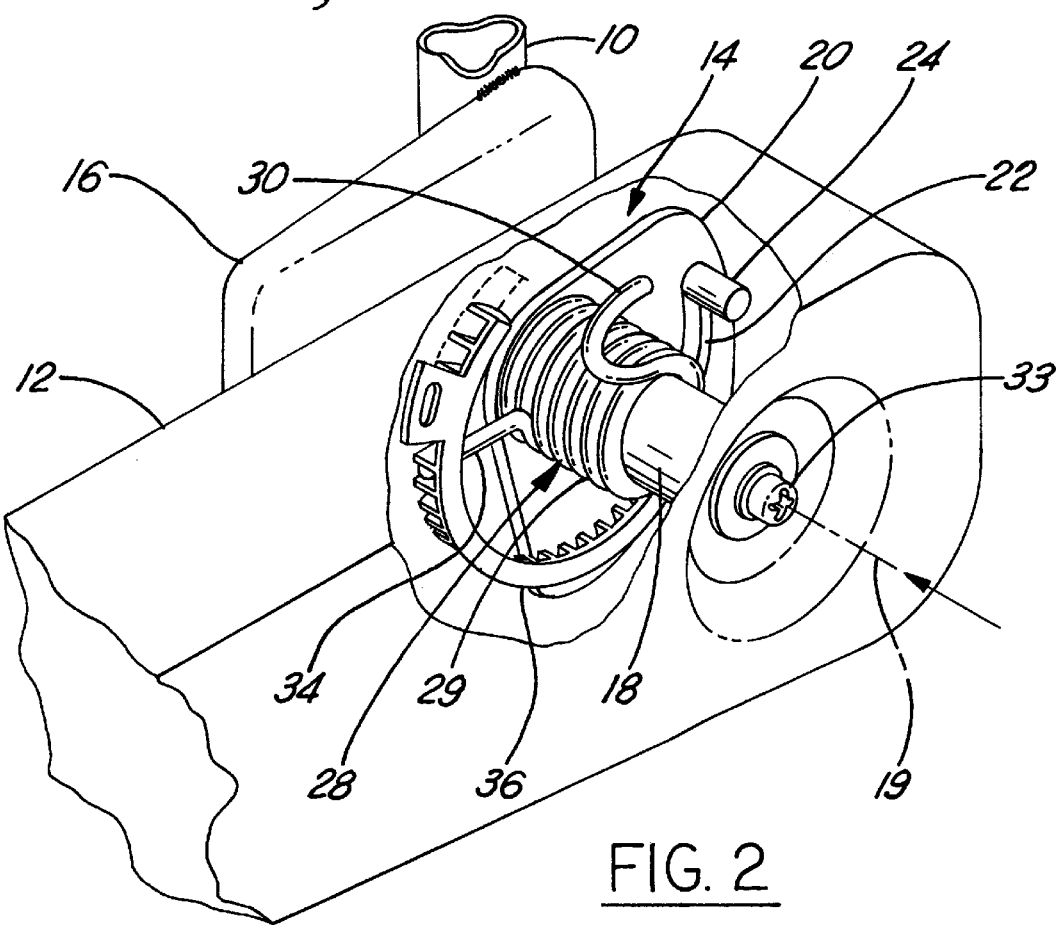
FIG. 2 is a perspective view of a broken out portion of an adjustable armrest and a portion of the seat back, showing a clutching mechanism.

Clutching mechanism 14 includes, as best shown in FIG. 2, a mounting plate 16 welded or otherwise fixed to seat back 10. A cylindrical shaft 18 having an axis of rotation 19 is welded or otherwise fixed on one end to mounting plate 16. A cam plate 20 is also welded or otherwise fixed to shaft 18 approximate to mounting plate 16. An arcuate travel limit slot 22 at a fixed radius from axis 19 is found in cam plate 20. A travel limit pin 24 is fixed to armrest 12 for unitary rotation therewith and is slideably disposed in travel limit slot 22 for arcuate movement therein.

Figure 3:
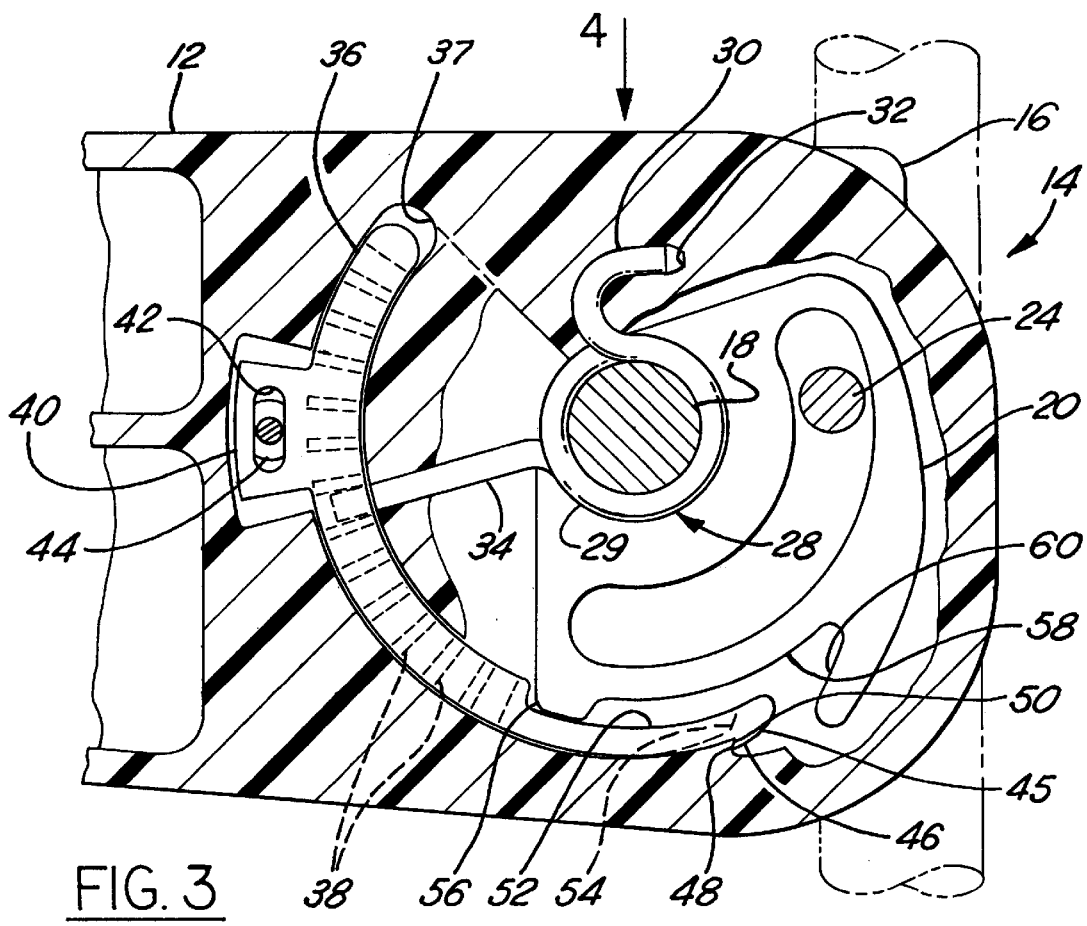
FIG. 3 is a sectional view of the adjustable armrest of FIG. 2 taken in the direction of arrow 3.
Figure 4:
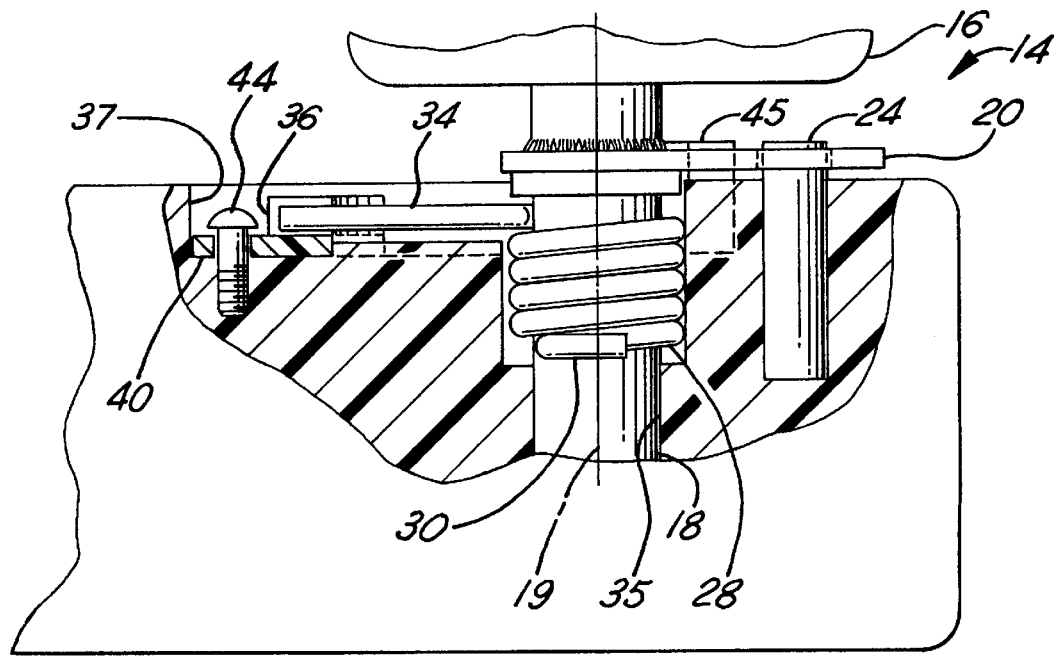
FIG. 4 is a section of the armrest and clutch mechanism of FIG. 3 taken in the direction of arrow 4.

A coil spring clutching member 28, formed of steel, has a helically wound body 29 wrapped around shaft 18 and engaging shaft 18 in a free state. A first end 30 of spring 28 is hooked, extending radially outwardly from shaft 18, and is received by an identically shaped groove 32 in armrest 12 as best seen in FIGS. 3 and 4. A second end 34 of spring 28 is straight, extending radially outwardly from shaft 18. A bore 35 in armrest 12 receives shaft 18 for rotatable support of armrest 12. A screw 33 and a washer retain armrest 12 on shaft 18.

An arc shaped clutch engagement member 36 formed of plastic is slideably disposed in a receiving channel 37 formed in armrest 12 concentric with axis 19. Engagement member 36 has a plurality of pockets or notches 38, one of which receives second end 34 of spring 28. Which notch 38 receives second end 34 is a function of the configuration of spring 28. Clutch engagement member 36 also includes a retaining tab 40 used to axially retain clutch engagement member 36 relative to armrest 12. As shown in FIGS. 3 and 4, a translating slot 42 in tab 40 receives a retaining screw 44, allowing arcuate translation of clutch engagement member 36 within channel 37, while preventing clutch engagement member 36 from falling out of armrest 12. Alternatively, clutch engagement member 36 could be retained by alternative means, such as placing a plate over tab 40 to axially retained clutch engagement member 36 without restricting its arcuate's movement.

A tip 45 of clutch engagement member 36 is generally barb shaped and has a sloping surface 46 which serves as a first coupling feature. Additionally, tip 45 includes an engagement feature 48 defined by a backside of tip 45 that engages a notch 50 in channel 37 when engagement member 36 is in a clutch released position as shown in FIG. 3. With tip 45 in the clutch released position, clutch engagement member 36 rotates as a unit with armrest 12, and armrest 12 can be freely pivoted up and down. An undercut section 52 of clutch engagement member 36 has an inner diameter portion of engagement member 36 between pockets 38 and tip 45 cut away, facilitating the radial deflection of tip 45 within channel 37.

Figure 5:
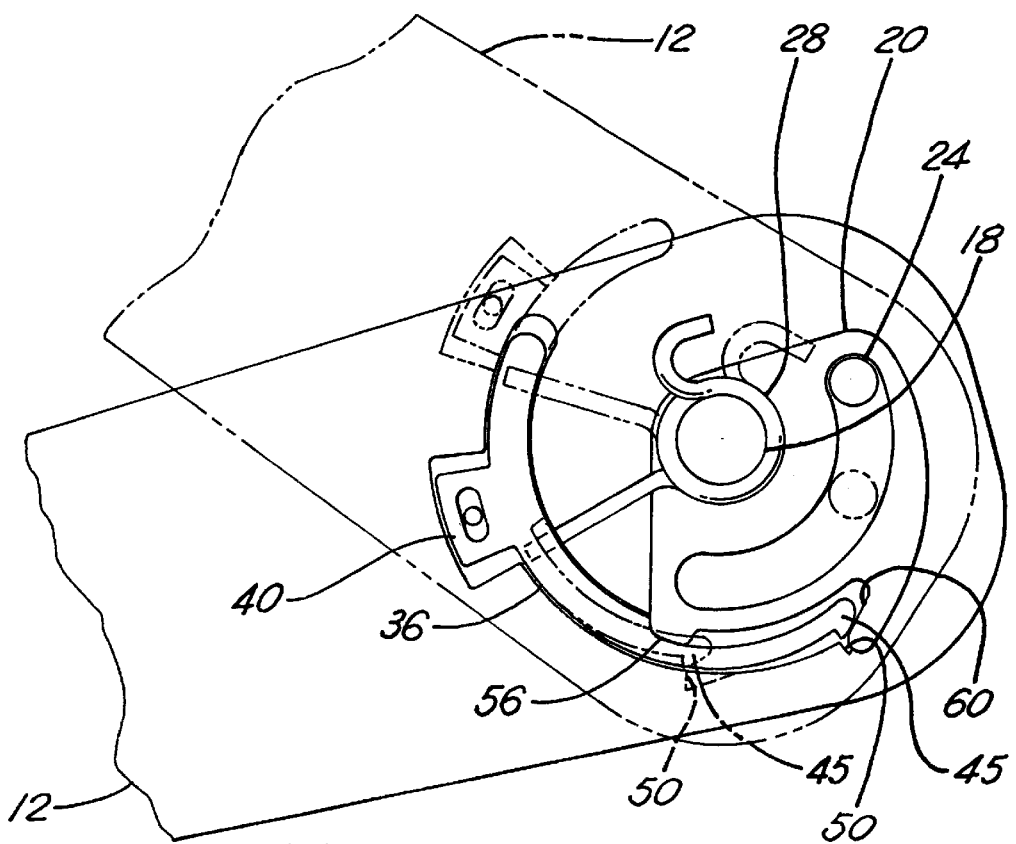
FIG. 5 is a view of the armrest and clutching mechanism of FIG. 3 with a maximum downward position shown in solid lines and a clutch engaged position shown in phantom.

Tip 45 additionally includes a first uncoupling feature 54 projecting above the undercut section 52 for engagement with a second uncoupling feature 56 defined by a radial projection on cam plate 20. The engagement occurs when armrest 12 is being returned to an upright position. First uncoupling feature 54 is configured to engage second uncoupling feature 56 when tip 45 is in a clutch engaged position as shown in FIG. 5. With tip 45 in the clutch engaged position, clutching member 28 engages shaft 18, allowing armrest 12 to be pivoted only in the upward direction.

Cam plate 20 includes a fixed radius arcuate surface 58 with a radius approximately equal to the inside diameter of channel 37. Cam plate 20 also includes a second coupling feature 60 consisting of an angular ramp disposed radially outwardly of arcuate surface 58 at an opposite end of arcuate surface 58 from second uncoupling feature 56.

Figure 6:
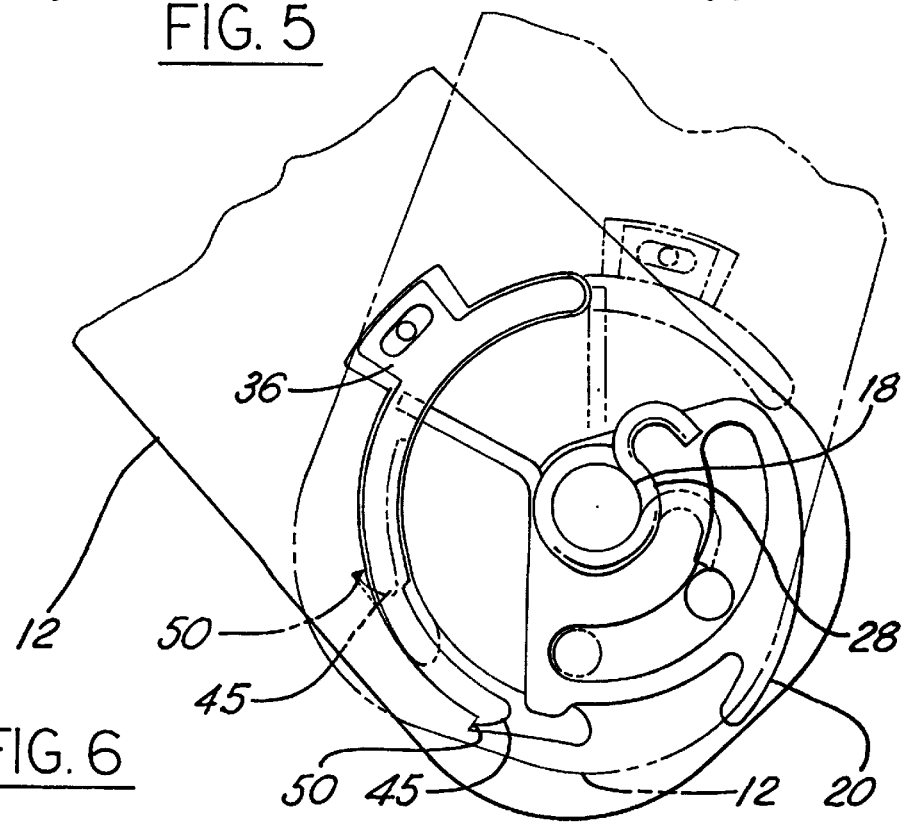
FIG. 6 is a side view of the armrest and clutching mechanism of FIG. 3 with the clutching mechanism and armrest shown in a clutch released position in solid lines, and in a fill upright position in phantom.

The invention operates in the following manner. Clutching mechanism 14, when armrest 12 is in a full upright position as shown in phantom in FIG. 6, is in a disengaged or released condition. Engagement feature 48 of tip 45 is engaged with notch 50 in the released position, preventing clutch spring 28 from fully gripping shaft 18 by maintaining first end 30 and second end 34 in a spread-apart condition. An amount of wrap of spring 28 around shaft 18, which can be quantified in terms of degrees or radians, is slightly less in the released position than in the engaged position. As armrest 12 moves down, as shown in FIG. 5, tip 45 is able to clear second uncoupling feature 56 as shown in phantom. Downward travel of armrest 12 is limited by engagement between pin 24 and a first end of travel limit slot 22. When tip 45 reaches second coupling feature 60, tip 45 is displaced radially inwardly with continued downward movement of armrest 12 until notch 50 moves completely past engagement feature 48 and the second end of spring 28 is able to arcuately displace clutch engagement member 36 to the engaged position consistent with the unloaded condition of spring 28. When clutch spring 28 is in a free or an unloaded condition, it is wrapped tightly around shaft 18 and acts as a one-way clutch with respect to shaft 18. Upward movement of armrest 12 is not inhibited, as movement in that direction tends to unwind spring 28. However, any downwardly applied force on armrest 12 is met with resistance by spring 28 which tends to wind around shaft 18, preventing any downward rotative movement.

When armrest 12 is raised upward to return it to the upright position, first uncoupling feature 54 of tip 45 engages second uncoupling feature 56 at the end of the armrest adjustment range as shown in phantom in FIG. 5. Further upward displacement of armrest 12 causes clutch engagement member 36 to be slideably displaced within channel 37 toward the clutch released position. As upward movement continues, engagement feature 48 is once again aligned with notch 50, with tip 45 resultantly dropping into notch 50 thereby placing clutch engagement member 36 back into the clutch released position as shown in solid lines in FIG. 6. This enables tip 45 to bypass second uncoupling feature 56, and armrest 12 to be restored to the upright position shown in phantom in FIG. 6. Armrest 12 is moved upward until travel limit pin 24 engages a second end of travel limit slot 22.

It is evident that many alternatives, modifications, and variations of the adjustable armrest mechanism of the present invention will be apparent to those skilled in the art in light of the disclosure herein. It is intended that the meets and bounds of the present invention be determined by the appended claims, rather than by the language of the above specification, and that all such alternatives, modifications, and variations which form a conjointly cooperative equivalent are intended to be included within the spirit and scope of these claims.

I claim:

1. A clutching mechanism adapted for pivotably mounting a first member relative to a second member, the clutching mechanism comprising:

an axis of rotation;

a first member with the axis of rotation passing therethrough;

a second member pivotably mounted relative to the first member for relative rotation therebetween about the axis of rotation;

a shaft fixed to the first member and centered on the axis of rotation;

a coil spring clutching member having a helically wound body wrapped around the shaft;

a first end of the spring clutching member extending radially outwardly from the body to engage the second member;

a second end of the spring clutching member extending radially outwardly from the body;

a cam plate fixed relative to the shaft and disposed adjacent the second member; and a clutch engagement member being slidably disposed relative to the second member and receiving the second end of the spring clutching member and being biased relative to the second member in a first rotative direction to a clutch engaged position by the spring clutching member and being selectively displaceable in a second rotative direction to a clutch released position responsive to engagement of the clutch engagement member with the cam plate wherein when the clutch engagement member is in the clutch engaged position the coil spring clutching member is a one-way clutch preventing relative rotation in a first direction in any one of an infinite number of in-use positions while enabling rotation in a second direction and when the clutch engagement member is in the clutch released position the coil spring clutching member enables rotation in both directions.

2. A clutching mechanism as claimed in claim 1 wherein the clutch engagement member is arcuately shaped for translation within an arcuate channel in the second member and the clutch engagement member has a tip on a first end with the tip being radially displaceable within the channel and the tip being radially outwardly biased against an outside diameter of the channel and the tip having an engagement feature and the tip engagement feature in the released position being engaged with a corresponding engagement feature in the outside diameter of the channel so that the second end of the spring member is deflected to a position slightly decreasing an amount of wrap of the spring member around the shaft and the tip engagement feature in the clutch engaged position being out of engagement with the engagement feature of the channel so that the second end of the spring member is unrestrained.

3. A clutching mechanism as claimed in claim 2 wherein the cam plate has a coupling feature and an uncoupling feature with contact between the coupling feature of the cam plate and the tip displacing the tip to the clutch engaged position and with contact between the tip and the uncoupling feature displacing the tip to the clutch released position.

4. A clutching mechanism as claimed in claim 3 wherein the uncoupling feature of the cam plate is a radial projection from an arcuate surface wherein continued angular displacement of the second member relative to the first member in the first direction after initial engagement of the tip with the radial projection results in relative motion of the clutch engagement member in the second direction to the clutch released position.

5. A clutching mechanism as claimed in claim 3 wherein the coupling feature of the cam plate is an angular ramp disposed radially outwardly of an arcuate surface wherein continued angular displacement of the second member relative to the first member in the second direction after engagement of the tip with the angular surface results in the tip being displaced radially inwardly and out of engagement with the engagement feature of the channel.

6. A seat with an adjustably mounted arm rest comprising:
   an axis of rotation;
   a first seat back with the axis of rotation passing therethrough;
   an arm rest pivotably mounted relative to the seat back for relative rotation therebetween about the axis of rotation;
   a shaft fixed to the seat back and centered on the axis of rotation;
   a coil spring clutching member having a helically wound body wrapped around the shaft;
   a first end of the spring clutching member extending radially outwardly from the body to engage the arm rest;
   a second end of the spring clutching member extending radially outwardly from the body;
   a cam plate fixed relative to the shaft and disposed adjacent the arm rest; and
   a clutch engagement member being slidably disposed relative to the arm rest and receiving the second end of the spring clutching member and being biased relative to the arm rest in a first rotative direction to a clutch engaged position by the spring clutching member and being selectively displaceable in a second rotative direction to a clutch released position responsive to engagement of the clutch engagement member with the cam plate wherein when the clutch engagement member is in the clutch engaged position the coil spring clutching member is a one-way clutch preventing relative rotation in a first direction in any one of an infinite number of in-use positions while enabling rotation in a second direction and when the clutch engagement member is in the clutch released position the coil spring clutching member enables rotation in both directions.

7. A seat as claimed in claim 6 wherein the clutch engagement member is arcuately shaped for translation within an arcuate channel in the arm rest and the clutch engagement member has a tip on a first end with the tip being radially displaceable within the channel and the tip being radially outwardly biased against an outside diameter of the channel and the tip having an engagement feature and the tip engagement feature in the released position being engaged with a corresponding engagement feature in the outside diameter of the channel so that the second end of the spring member is deflected to a position slightly decreasing an amount of wrap of the spring member around the shaft and the tip engagement feature in the clutch engaged position being out of engagement with the engagement feature of the channel so that the second end of the spring member is unrestrained.

8. A seat as claimed in claim 7 wherein the cam plate has a coupling feature and an uncoupling feature with contact between the coupling feature of the cam plate and the tip displacing the tip to the clutch engaged position and with contact between the tip and the uncoupling feature displacing the tip to the clutch released position.

9. A seat as claimed in claim 8 wherein the uncoupling feature of the cam plate is a radial projection from an arcuate surface wherein continued angular displacement of the arm rest relative to the seat back in the first direction after initial engagement of the tip with the radial projection results in relative motion of the clutch engagement member in the second direction to the clutch released position.

10. A seat as claimed in claim 8 wherein the coupling feature of the cam plate is an angular ramp disposed radially outwardly of an arcuate surface wherein continued angular displacement of the arm rest relative to the seat back in the second direction after engagement of the tip with the angular surface results in the tip being displaced radially inwardly and out of engagement with the engagement feature of the channel.

* * * * *